Patented Nov. 25, 1947

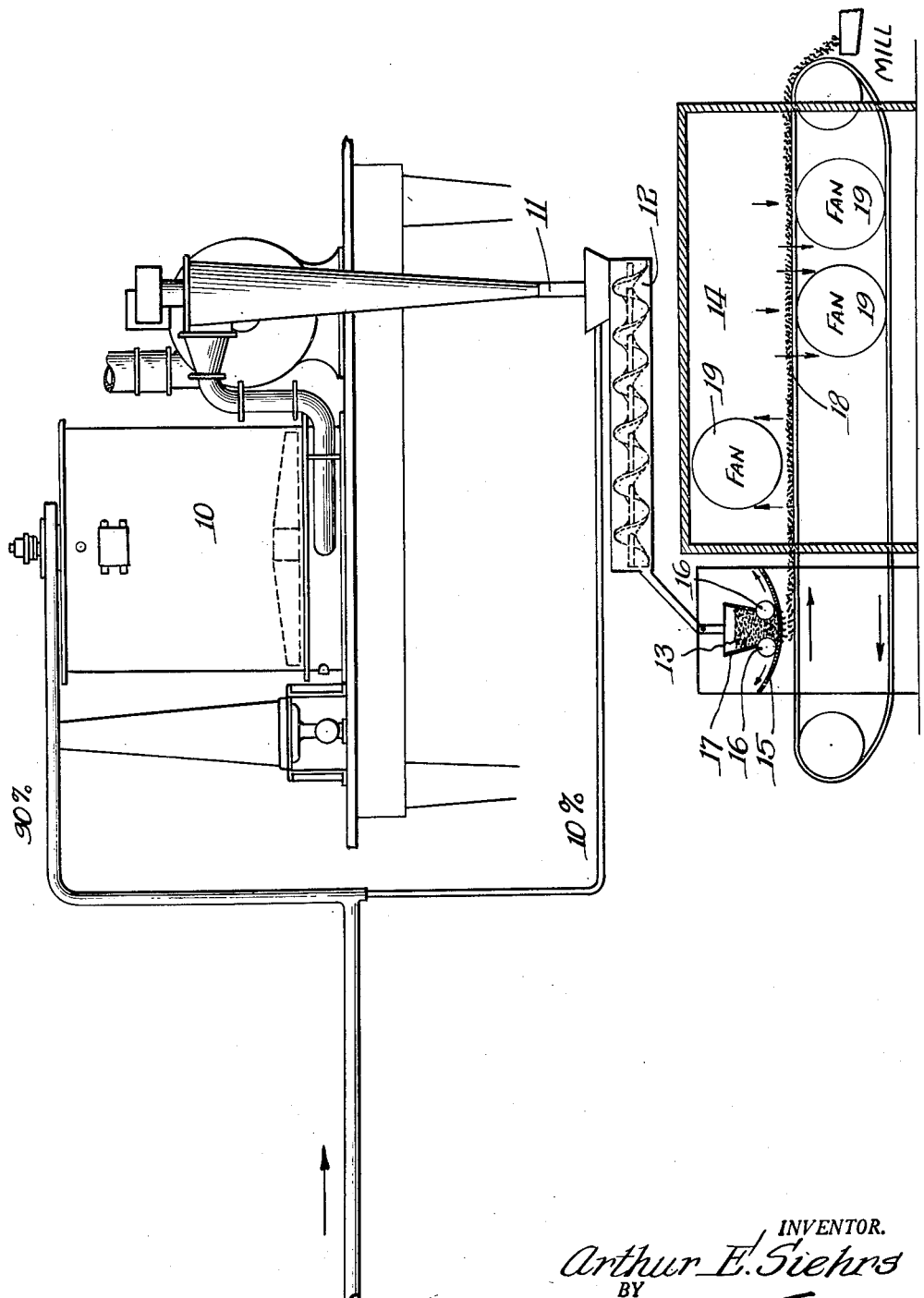

2,431,622

UNITED STATES PATENT OFFICE 2,431,622

DRYING OF EXTRACT SOLUTIONS

Arthur E. Siehrs, Chicago, Ill., assignor, by mesne assignments, to Krim-Ko Corporation, Chicago, Ill., a corporation of Illinois Application January 8, 1945, Serial No. 571,925

15 Claims. (Cl. 99—206)

1

The current invention pertains to a novel procedure or better method whereby the advantages incident to the use of a spray-drier may be availed of in the moisture elimination of Irish moss extract-solution and other extracts or comparable substances which cannot be satisfactorily dried solely in a spray-drier because of the impossibility of obtaining by so doing of a product of such physical properties and characteristics as to be commercially acceptable as a feasible spray-dried material, the term water soluble as used herein referring to those materials which may either go into true solution in water, or those which are dispersed in water and so can be extracted by water.

In treating milk in a spray-drier, it is necessary to condense the milk preliminarily to approximately 40% solids in order to obtain a spray-product which is heavy and compact enough to pack in barrels or other containers without an extensive loss and expensive cost of packaging by reason of the fluffiness of the material and also to afford a powdery solid material which is dense enough so that too much surface is not exposed to the air thus avoiding deterioration of the product.

If an attempt be made to spray-dry milk which has a solids-content of only 3% or 4%, the resulting effect will be a material so light and fluffy that a barrel of ordinary size, which will hold about one-hundred pounds of dried milk solids, will accommodate only about ten to fifteen pounds, and in addition the downy product degenerates rapidly due to a large percentage of surface exposure to the air.

The only reason it is feasible to dry milk commercially in a spray-drier is due to the fact that it is possible to condense the milk first in an evaporator to about 40% solids, referred to above, without having an unduly thick or excessively viscous product at the 40% concentration.

Numerous substances, however, such as various gums comprising gum karaya, gum tragacanth, gelatin, Irish moss, other sea-weed extracts of the type of agar-agar or sodium alginate, pectin and numerous other substances cannot be obtained in water concentrations higher than from 1% to 10%, because their solutions in water are very thick and viscous, and, due to the fact that they have such characteristics, they cannot be handled by normal plant equipment.

Specifically in the case of Irish moss extract-solution, it is impossible to obtain a concentration greater than 3½% or 4% before the material

2 becomes so solid that the solution cannot be pumped or sprayed through the nozzles of the spray-drier, this property of the Irish moss extract obviously limiting the solids content of the material to be sprayed. Concentrated Irish moss solution can be sprayed and a dried product obtained from the sprayer, but, inasmuch as the solution being sprayed has such a low limit of solids, the resulting dried material is extremely fluffy and has a very low apparent density, the consequence being that the lightness of the material presents substantial packaging difficulties.

In addition, since such spray-dried Irish moss extract is in the form of a very light powder, it has a large surface area exposed and when solution of such powder in water is attempted, the material has a substantial tendency to lump up into a ball and to resist solution unless extremely vigorous agitation is employed.

A further consequence of the large amount of exposed surface is the fact that this material is quite hydroscopic and degenerates rapidly under the influence of atmospheric moisture and ordinary summer temperatures; but if the Irish moss extract-solution is dried by other means, such as atmospheric or vacuum roller driers, the resulting product has a much higher apparent density and mixes readily with water without the troublesome lumping of the spray-dried product. Moreover, the roller-dried product is more stable in the presence of moisture and temperature than the spray-dried product.

For these reasons, it has heretofore been impossible to satisfactorily spray-dry materials of this type and the present invention relates to an improved method by which it is practicable and feasible to use a spray-drier to accomplish the desired result.

In order to enable those skilled in this art to understand this innovatory invention, the advantages accruing therefrom and the means employed for performing the novel method of procedure, the appliance used therefor has been illustrated in the single view of the accompanying drawing forming a part of this specification and to which reference should be had in connection with the following detailed description, this drawing presenting the parts of the appliance more or less diagrammatically.

Essentially the current new invention consists in the employment of means by which about 90% of the Irish moss water-extract to be dried is put through the spray-drier 10, of known construction, in the customary manner thus giving rise to a fluffy, dried product which formerly would not have been commercially usable.

Such dried material is delivered from the drier at 11 into a dough-mixer 12, of any ordinary and suitable construction, wherein it is mixed with the remaining 10% of the extract-solution and formed into a dough-mass of suitable consistency which is fed into the rolling extruder feed 13 of an areo-form drying system 14 wherein the dough-like material is pressed through the perforations in a plate 15 by rollers 16, 16 at the discharge end of an oscillating hopper 17 whereby the dough forced through such small apertures is fed on to an endless conveyor 18 on which it is subjected to war or hot air fed through and over it by a plurality of fans 19, the resulting product at the discharge end of the belt being a body of dried small-size individual extruded particles.

This product may then be ground in a hammer-mill or chopped to obtain the desired form, shape or size of the particles and such body of material has a much higher apparent specific-gravity than the spray-dried extract.

In addition, it is possible to regulate the density of these small particles by varying the amount of extract re-mixed with the spray-dried material and also by modifying the pressure used in the extrusion process.

Further, it is feasible to case-harden the pellets by varying the several factors involved to achieve a much higher resistance to atmospheric influences, so that the resulting product is much more stable on storage during warm humid days than the fluffy spray-dried product is.

The new process is applicable to many materials which formerly were produced only by chemical precipitation or freezing, as in the case of agar-agar and will allow the use of processes which will materially reduce their processing cost. Whereas, above, the liquid which forms the spray-dried product into a dough-like material is indicated as a part of the original extract it need not necessarily be so in that in the case referred to water, or other suitable liquid, rather than the extract, could be employed.

Obviously the extruded dried particles, case-hardened or not, may be sold and used as such, or they may be ground as referred to at any time subsequent to such drying.

Ordinarily this new procedure would not be necessary for a liquid containing over 20% to 25% of solids spray-dried to powder-form.

Hereinabove reference has been made to various substances which cannot be obtained in water concentrations higher than 1% to 10% due to the fact that their water solutions are very thick and viscous, but other employable compounds may be substances whose limitations on solids are due to factors other than thickness of the liquid, such as very slight solubility or other reasons for not wishing to subject a concentrated solution to drying.

Furthermore, although the subdivision of the dough body into small particles by extrusion has been mentioned, it is to be borne in mind that this is only one way of preparing the dough for efficient drying, and that other procedures can be satisfactorily resorted to, such, for example, as rolling the dough into a very thin sheet and drying it in that condition.

Those acquainted with this art will readily understand that the invention, as defined hereinafter, is not necessarily limited to the precise and exact details of structure or procedure set forth and that these may be modified within reasonable limits as occasion indicates.

In some cases, for example in connection with gelatin, it may be desirable or necessary to perform some auxiliary procedural steps in order to so change the properties of the dough that it can be readily formed into small particles for drying, as where the addition of moisture to the previously spray-dried material would result in a product which was a somewhat sticky dough.

There are at least two methods of solving such a difficulty, the first being to lower the temperature of the dough sufficiently so that the material loses its sticky properties, either due to freezing or by reason of gel-formation of the colloidal material, or other changes in attributes. This rather hard, tough dough can then be broken up into small particles by any conventional means such as a hammer-mill, a sharp-edged cutting-device, or by numerous other processes, and the resulting fine particles may then be dried in the continuous belt-dryer.

The other method involves the addition of liquid to the previously spray-dried material to form a dough and if this dough exhibits sticky characteristics which would prevent its subdivision into small particles or into a thin sheet, it is possible to add to this dough in the mixer, or any second mixer, a sufficient amount of material previously dried in the spray-drier and continuous belt-drier to absorb the excess moisture and eliminate the sticky condition of the dough. Such dough, of course, may then be easily subdivided into fine particle size or into thin sheets for drying. The reason why, what might be termed an excess of liquid is first added to the previously spray-dried material to form a sticky dough, is that it may be desirable to add such amount of liquid in order to thoroughly compress the spray-dried particles to the desired density, a possible example of this second procedure being in the case of the use of pectin.

I claim:

1. The novel supplemental method of treating the fluffy spray-dried product from a liquid containing less than 25% thickening solids, including wetting such product and making a dough thereof, then forming such dough for efficient drying, and drying the formed dough.

2. The novel supplemental method of treating the fluffy spray-dried product from a liquid containing less than 25% thickening solids, including wetting such product and making a dough thereof, then subdividing such dough into small particles, and drying said particles.

3. The novel supplemental method set forth in claim 1, in which said forming of the dough is effected by extruding it to provide small particles.

4. The novel supplemental method set forth in claim 1, in which the wetting-agent is like liquid.

5. The novel supplemental method of treating the fluffy spray-dried product from a liquid containing less than 25% thickening solids, including wetting such product with like liquid and making a dough thereof, then subdividing such dough into small particles, and drying said particles.

6. The novel supplemental method of treating the fluffy spray-dried product from a liquid containing less than 25% thickening solids, including wetting such product with like liquid and making a dough thereof, then extruding such dough into small particles, and drying said particles.

7. The novel supplemental method of treating the fluffy spray-dried product from Irish moss extract-solution, including wetting such product and making a dough thereof, then forming such dough for efficient drying, and drying the formed dough.

8. The novel supplemental method of treating the fluffy spray-dried product from Irish moss extract-solution, including wetting such product and making a dough thereof, subdividing such dough into small particles, and drying said particles.

9. The novel supplemental method set forth in claim 7, in which the wetting-agent is Irish moss extract-solution.

10. The novel supplemental method set forth in claim 8, in which the wetting-agent is Irish moss extract-solution.

11. The novel supplemental method of treating the fluffy spray-dried product of Irish moss extract-solution, including wetting such product with Irish moss extract-solution and making a dough thereof, extruding such dough into small particles, and drying said particles.

12. The novel supplemental method set forth in claim 7, in which the wetting-agent is Irish moss extract-solution in quantity about one-ninth of the extracted-solution used to produce the quantity of the spray-dried product wetted thereby.

13. The novel supplemental method set forth in claim 8, in which the wetting-agent is Irish moss extract-solution in quantity about one-ninth of the extract-solution used to produce the quantity of the spray-dried product wetted thereby.

14. The novel supplemental method of treating the fluffy spray-dried product from a liquid containing less than 25% thickening solids, including wetting such product to provide a sticky dough, reducing the temperature of such dough to overcome its sticky characteristics, forming such reduced-temperature dough for efficient drying, and drying the formed dough.

15. The novel supplemental method of treating the spray-dried product from a liquid containing less than 25% thickening solids, including wetting such product to provide a sticky dough, adding to such sticky dough sufficient of the spray-dried product to overcome its sticky properties, then forming such treated dough for efficient drying, and drying the formed dough.

ARTHUR E. SIEHRS.

REFERENCES CITED

The following references are of record in the file of this patent:

UNITED STATES PATENTS

| Number | Name | Date |
|---|---|---|
| 1,235,716 | Mooney | Aug. 7, 1917 |
| 2,358,827 | Rakowsky | Sept. 26, 1944 |
| 1,157,935 | Gray | Oct. 26, 1915 |
| 1,063,581 | Nicolai | June 3, 1913 |
| 2,192,041 | Headland | Feb. 27, 1940 |
| 1,278,297 | Bradden | Sept. 10, 1918 |
| 1,735,356 | Neff | Nov. 12, 1929 |
| 1,814,986 | Walsh | July 14, 1931 |
| 2,108,582 | Dunham | Feb. 15, 1938 |
| 1,239,766 | Brownell | Sept. 11, 1917 |
| 1,250,427 | Cambell | Dec. 18, 1917 |
| 1,668,446 | Anderson | May 1, 1928 |
| 1,240,816 | Brownell | Sept. 25, 1917 |
| 1,726,511 | Henry | Aug. 27, 1929 |
| 2,143,413 | Ellis | Jan. 10, 1939 |